Feb. 16, 1932.  F. A. CLOSE  1,845,482
TILE CONSTRUCTION
Filed April 30, 1930   2 Sheets-Sheet 1
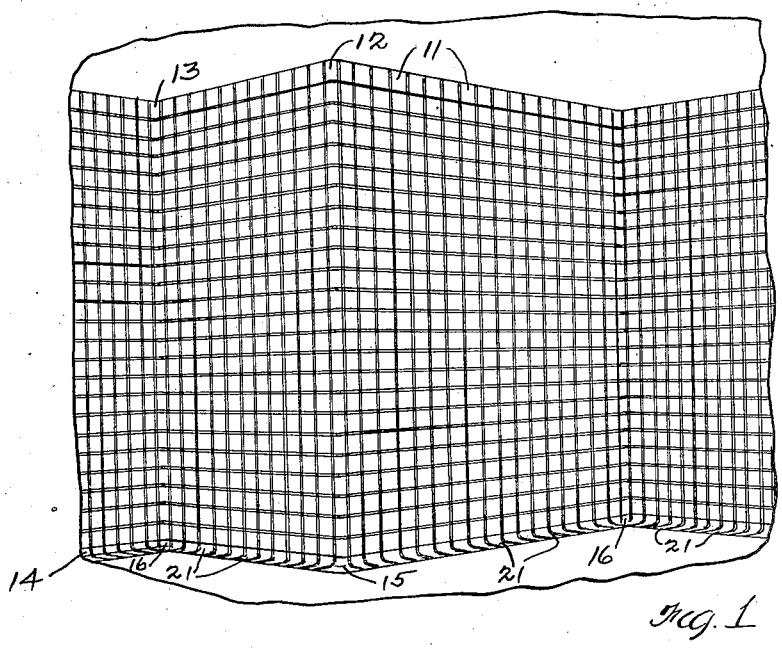
Fig. 1
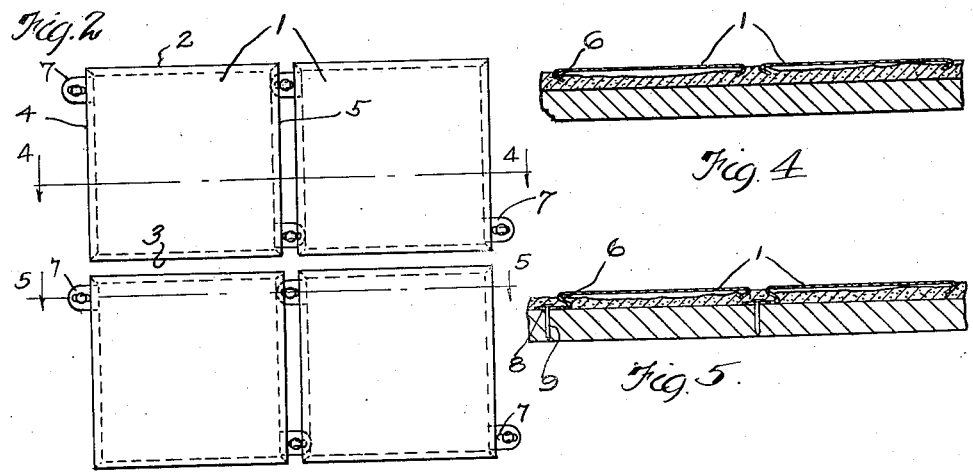
Fig. 2
Fig. 4
Fig. 5
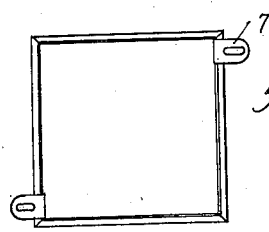
Fig. 3
INVENTOR.
FRANCIS ARTHUR CLOSE
BY
Fay, Oberlin & Fay
ATTORNEYS.

Feb. 16, 1932.  F. A. CLOSE  1,845,482
TILE CONSTRUCTION
Filed April 30, 1930   2 Sheets-Sheet 2
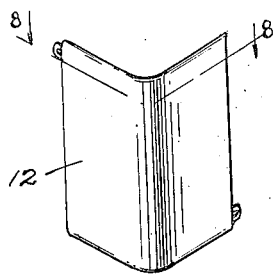
Fig. 6
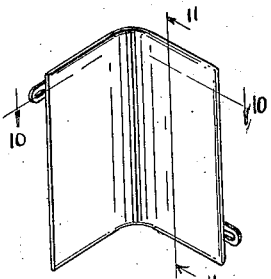
Fig. 9
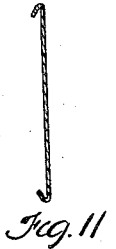
Fig. 11
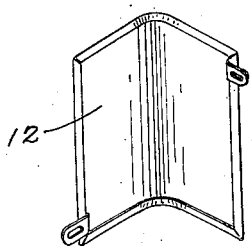
Fig. 7
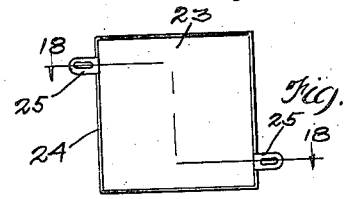
Fig. 17
Fig. 10
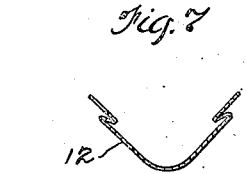
Fig. 8.
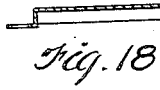
Fig. 18
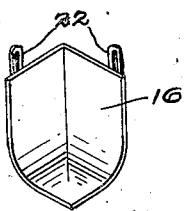
Fig. 16
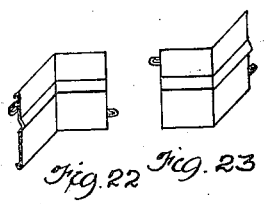
Fig. 22  Fig. 23
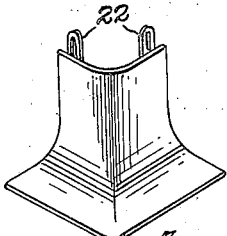
Fig. 13
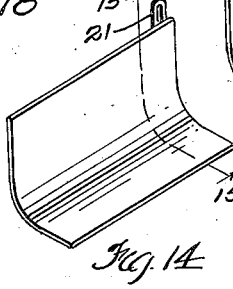
Fig. 14
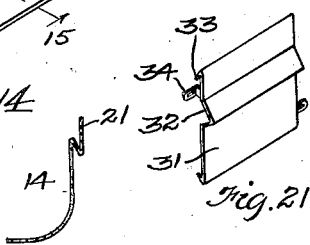
Fig. 21
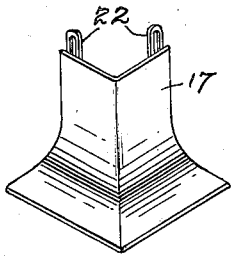
Fig. 12
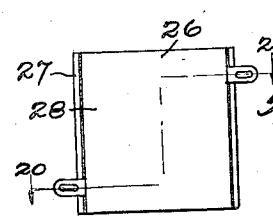
Fig. 19
Fig. 15
Fig. 20
INVENTOR.
FRANCIS ARTHUR CLOSE
BY Fay, Oberlin & Fay
ATTORNEYS.

Patented Feb. 16, 1932

1,845,482

UNITED STATES PATENT OFFICE

FRANCIS ARTHUR CLOSE, OF CLEVELAND, OHIO, ASSIGNOR, BY MESNE ASSIGNMENTS, TO FERRO ENAMEL CORPORATION, OF CLEVELAND, OHIO, A CORPORATION OF OHIO

TILE CONSTRUCTION

Application filed April 30, 1930. Serial No. 448,741.

This invention as indicated relates to a tile construction and method of making the same. More particularly it comprises a tile construction wherein the units are preferably formed of metal plates covered with enamelled glass and provided with special features of construction which permit the same to be readily applied to a supporting surface. The preferred form of construction contemplates the use of units formed of sheet metal having marginal portions on all of its sides bent angularly to form flanges and such flanges being inclined inwardly so as to provide an anchoring or locking pocket to receive soft material should the devices be applied thereto and the lower edges of any two opposite flanges being provided with securing tabs whereby the units may be secured to a rigid surface by nailing or otherwise fastening the same. The invention also contemplates various modifications of this preferred construction and also, the provision of variously formed units, so as to be suitable for covering a plain wall surface, and for connecting the same with the ceiling and floor surfaces, and for carrying the covering about projecting and re-entrant corners.

The invention also contemplates the method of spacing the units when applying the same to a surface so that where a particular space is to be filled with a certain number of units the units may be equally spaced from each other across the entire surface, thus requiring no cutting or changing of the appearance of the surface while the space between the units will be of somewhat greater width than at other points and will be filled with suitable paste or other filling material.

The invention also has in view the close setting of the tile units where it becomes desirable so that a substantially unbroken surface can be provided if it is found necessary.

To the accomplishment of the foregoing and related ends, said invention, then, consists of the means hereinafter fully described and particularly pointed out in the claims.

The annexed drawings and the following description set forth in detail certain means and one mode of carrying out the invention, such disclosed means and mode illustrating, however, but one of various ways in which the principle of the invention may be used.

In said annexed drawings:

Fig. 1 is a perspective view showing a wall construction embodying a plurality of tile units of several different shapes and sizes; Fig. 2 is an elevation showing a plurality of tile units applied to a plain wall surface; Fig. 3 is a view of the rearward face of a single tile unit of the character shown in Fig. 2; Fig. 4 is a transverse sectional view taken along the line 4—4, shown in Fig. 2, looking in the direction of the arrows; Fig. 5 is a view similar to Fig. 4 taken along the line 5—5 shown in Fig. 2, looking in the direction of the arrows; Fig. 6 is a perspective view of the front face of the tile unit adapted to be spaced upon the projecting corner; Fig. 7 is a rear view of the tile shown in Fig. 6; Fig. 8 is a transverse sectional view taken along the line 8—8 shown in Fig. 6; Fig. 9 is a view of a tile unit intended for use on re-entrant corners; Fig. 10 is a horizontal vertical sectional view thereof, taken along the line 10—10 shown in Fig. 9; Fig. 11 is a vertical sectional view taken along the line 11—11 shown in Fig. 9; Fig. 12 is a perspective view of a tile unit for projecting corners to be applied at the floor or ceiling line; Fig. 13 is a perspective view of a tile similar to that of Fig. 12, but having a curved central face portion instead of a sharp-edged portion; Fig. 14 is a perspective view of a tile unit intended for use at the floor or ceiling line of a wall structure; Fig. 15 is a vertical sectional view of the tile unit shown in Fig. 14, taken along the line 15—15, looking in the direction of the arrows; Fig. 16 is a perspective view of a tile unit intended for the floor contact line of the wall construction at a point where a re-entrant corner is found; Fig. 17 is a rear view of a tile unit provided with straight marginal flanges; Fig. 18 is a view of the transverse sectional view of the unit shown in Fig. 17 taken along the line 18—18 shown in Fig. 17; Fig. 19 is a rear elevation of a tile unit having only two inturned marginal portions, those at the top and bottom being without flanges; Fig. 20 is a sectional view of the tile unit shown in Fig. 19, taken along the line 20—20 shown in Fig. 19; Fig. 21 is a perspective view of a tile unit having an ornamental central rib, with inturned top and bottom margins and plain side edges carrying off-set tabs; and Figs. 22 and 23 respectively inside and outside corner tile units embodying the structural features of the tile unit shown in Fig. 21.

As will more clearly appear from Figs. 2 to 5 of the drawings, the invention contemplates the provision of a plurality of enamel glass coated sheet metal units 1 preferably square in outline and each formed of a sheet metal plate having the top and bottom marginal edges 2, 3, 4, 5, inclined backwardly and inwardly so that a recess 6 will be formed within which soft material may be engaged when the tile is pressed against plaster or other material of suitable consistency. The vertical flanges 4, 5, on opposite sides are provided with ears or tabs 7 preferably formed integrally therewith and lying in a plane immediately below the lower edge of the main portion of said flanges. The tile units thus are supported in spaced relation to a rigid surface when they are secured thereto by means of fastening elements cooperating with said projecting tabs. It has been found that by providing an elongated slot 8 in such tabs, a nail 9 may be driven through such at a suitable point and the unit may be shaped until the nail has been seated and a desired amount of space is provided between a tile unit and its companion units on either side. The tabs are preferably of a length sufficient to permit them to form a support for the adjacent units even though the said units are moved some distance from each other. Thus each unit will rest upon the surface of the tabs on the adjacent unit and will not be borne directly to the surface to which the units are attached. Each horizontal row of tile units is independent of its adjacent rows, the units in each row being inter-dependent to the extent that the ears of the unit on either side support are cooperated with the ears on the unit under consideration. When it is found desirable to secure the units against a soft surface, the backward curvature of the marginal flanges readily facilitates this operation in that the plastic material will be squeezed into a position behind said flanges and interlock with the same. As is indicated in Fig. 1, the units are of several different types, those in the body of the wall section 11 being of the type illustrated more particularly in Fig. 2, and those at the corners 12 corresponding at the projecting corners to the form illustrated in Figs. 6, 7 and 8, and at the re-entrant corners 13 to the forms illustrating to the Figs. 9, 10, and 11, and at the floor line forms 14, 15 and 16, corresponding to the views shown in Figs. 14, 13 and 16, respectively.

The tile units are made of sheet metal which is thoroughly cleaned before being operated upon and is then coated with an uncolored glass coating throughout and is thereafter given a colored opaque coating over its outer surface, the tabs preferably being wiped free of the enamel so as to present an even thickness of metal to be positioned beneath and adjacent the tile to space the same from the supporting surface as heretofore indicated. The tabs, as stated, are preferably formed integrally with a vertical or lateral flange of the units and an elongated slot is formed through each of said tabs through which a fastening element may be engaged.

The method of securing the standard wall units to a plastic surface is illustrated in Fig. 4 wherein the flanges are forced into the plastic layer and a portion thereof is caused to engage behind the downwardly and inwardly inclined flanges.

While the tile may be used on a plastic surface as stated, in the greater proportion of instances, the tile will be nailed or similarly secured to a rigid surface through the use of fastening elements engaged through the projecting tabs above described. This method of securing tile is shown in Fig. 5 of the drawings. The tab as illustrated underlies the downwardly and inwardly turned flange of the adjacent tile unit and thus spaces the flanges of such tile unit from the supporting surface.

When a corner is to be covered the tile unit 21 instead of being made rectangular is formed upon an angle, the lateral edges of which are spaced a distance of the standard tile size used (in this instance 3 inches measured on the surface to be covered). The tile unit itself is spaced from the wall surface and is of slightly greater dimension than the distance measured on the surface to be covered in order to have a rounded form and present a more pleasing appearance. This shaping of the tile is disclosed in Figs. 6, 7, 8, 9 and 10.

The tile units 12 shown in Figs. 6, 7 and 8 are intended for application to outside corners and have their respective sides at right angles to each other. The same is true of the form of tile unit 13 shown in Figs. 9, 10 and 11. The tile units 14, as shown in Figs. 14 and 15, are formed without the inturned marginal flanges in order to provide for a closer fit to the adjacent surfaces. The tabs 21 are off-set rearwardly in the usual manner in all these constructions.

The outside corner units 17 shown in Fig. 12, and 15 shown in Fig. 13, and the inside corner unit 16, likewise have the inturned marginal flanges omitted, but have rearwardly offset tabs 22.

For certain installations the plain tile units 23 may be provided with straight flanges 24 at right angles to the body of the unit, and carrying tabs 25 as is shown in Figs. 17 and 18, or the unit 26 may be provided with inturned flanges 27 on the side edges only, each carrying a securing tab 28, as is shown in Figs. 19 and 20.

Where a finishing rib or bead is desired to give a panel effect or a special ceiling or base board bead, tile units of the character shown in Figs. 21, 22 and 23 may be used. The flat unit 31 shown in Fig. 21 is formed with a transverse rib or offset 32. Inturned flanges 33 are provided at the top and bottom and securing tabs 34 offset rearwardly at the side edges. In addition to the plain tile units, inside corner units 35 and outside corner units 36 of this construction are provided as is shown in Figs. 22 and 23.

The tile units are placed on the wall surface by first setting the full lowermost horizontal row or the full uppermost horizontal row, the tile preferably being spaced from each other an equal distance so as to divide the intervening space evenly between the various units. The succeeding rows are then formed by having the units thereof set in vertical alinement with the units of the preceding row. Suitable corner tile units are used where it becomes necessary to cover the angles of the wall space and tile units of suitable curvature are used at the top and bottom of the area to be covered. Where repairs become necessary, it will be found possible to withdraw one or more tile units at the point where replacement is desired without removing the entire wall section or entire row of tile units as is necessary where interlocking units are employed.

Other modes of applying the principles of this invention may be employed instead of the one explained, change being made as regards the means and the steps herein disclosed, provided those stated by any of the following claims or their equivalent be employed.

I therefore particularly point out and distinctly claim as my invention:

1. A wall tile formed of sheet metal with an enamelled surface and having a plurality of downwardly and inwardly directed flanges and securing tabs formed as extensions of said flanges, and lying parallel to and beneath the plane of the lower edge of said flanges, and extending laterally beyond the edges of said enamelled surface.

2. A wall tile comprising a unit of sheet metal with an enamelled outer surface over the body thereof, and having a plurality of downwardly and inwardly directed flanges, and flat securing tabs formed integrally with said flanges and extending beyond the edges of said outer surface, said tabs being disposed in a plane parallel to and beneath the top surface of said unit, and positioned at diagonally opposite corners of said unit and each tab having an elongated slot formed therein.

Signed by me this 4th day of March, 1930.

FRANCIS ARTHUR CLOSE.